2,888,443

METHOD FOR THE PRODUCTION OF DRY AGGLOMERATED RUBBER ACCELERATORS AND PRODUCT PRODUCED THEREBY

Donald W. Hayes, Akron, and Harold P. Roberts, Tallmadge, Ohio, assignors to The Goodyear Tire & Rubber Company, Akron, Ohio, a corporation of Ohio No Drawing. Application September 23, 1955
Serial No. 536,271

13 Claims. (Cl. 260—79.5)

This invention relates to powdered vulcanization accelerators in a new and more useful form. More specifically, it relates to methods for agglomerating certain powdered accelerators.

The use of powdered organic accelerators in the compounding of natural and synthetic rubber presents certain problems to the rubber goods manufacturer. For example, the finely divided nature of the accelerator causes it to be blown into the air during production operations such as milling. This results in an increase in the cost of production and in the possible contamination of other materials. Then, too, certain of these accelerators create serious health hazards in production operations because once blown into the air surrounding production operations, they cause irritation to the skin and nasal passages of the workmen exposed to the contaminated air. In addition, the fine powder-like nature of the pigment makes uniform dispersion difficult since the pigment tends to form lumps and flakes which stick to or cake on the mill rolls, thus increasing the time and effort required to form an intimate and thorough dispersion of the pigment in the rubber.

Efforts have been made to reduce the objectionable features of the powdered accelerators by converting the finely divided pigment particles into some form of agglomerate. It has usually been found that, in order to form such agglomerates, some additive must be used with the powdered pigment if the agglomerate, once formed, is to be stable. Frequently the additives are materials which may be objectionable when ultimately mixed into the rubber compound with which the accelerator is to be used. Other additives produce agglomerates which are cohesive and not free-flowing, with the result that such agglomerates do not lend themselves to normal handling and weighing procedures. Other additives employed for preparing agglomerated accelerators are used in such large amounts that the rubber chemist is required to work with an excessively "diluted" accelerator. Other treatments produce agglomerated accelerators which do not disperse readily into the rubber during the milling operation. Still other treatments result in an agglomerated form which is not sufficiently stable to maintain its agglomerated form while it is transported from the manufacturer to the user. All of these objections have been overcome by preparing the powdered accelerators in an agglomerated form according to the methods of this invention.

One object of this invention is to provide for the preparation of powdered accelerators in an agglomerated form which will substantially eliminate the tendency of such accelerators to form dust which is blown into the surrounding air during storage, shipping, weighing, and processing operations. The use of these novel forms of accelerator results in a material saving to the manufacturer, the elimination of a source of contamination, and the elimination of a health hazard to the workmen handling such materials.

Another object of this invention is to provide for the preparation of these accelerators in an agglomerated form of such a nature that the individual particles of the agglomerate will hold together during normal handling operations and yet will disperse uniformly into and through the rubber during the milling operation. Still another object is to provide for the preparation of agglomerated organic rubber vulcanization accelerators which disperse more rapidly into the rubber during milling than will the unagglomerated powdered accelerator itself. An additional object is to prepare agglomerated accelerators which are free-flowing and not cohesive. Another object is to prepare agglomerated organic accelerators with a minimum amount of diluent. Still another object is to prepare agglomerated accelerators which contain no materials deleterious to the rubber compound with which the accelerator is to be used.

The rubber accelerators to which this invention relates are tetramethyl thiuram disulfide, tetraethyl thiuram disulfide, tetramethyl thiuram mono-sulfide, zinc dimethyl dithiocarbamate, zinc diethyl dithiocarbamate, zinc dibutyl dithiocarbamate, mercaptobenzothiazole, benzothiazyl disulfide, and the water-insoluble metallic salts of mercaptobenzothiazole such as zinc mercaptobenzothiazole and lead mercaptobenzothiazole. For certain compounding purposes two or more of these accelerators may be employed to form a mixed agglomerate.

One type of additive used in the preparation of agglomerated accelerators is natural or synthetic rubber latex. It has been observed, however, that these accelerators, and particularly mercaptobenzothiazole, when mixed with latex cause coagulation of the latex before the latex and the accelerator can be thoroughly blended together. This premature coagulation prevents the production of agglomerated accelerators having the desired characteristics.

In accordance with this invention, it has been found that the objects of this invention can be accomplished by mixing an aqueous slurry of the accelerator with a small amount of a rubber latex containing an antioxidant and an acid-stable synthetic emulsifier, coagulating the latex after it has been thoroughly blended with the accelerator, removing the excess water, forming agglomerates, and drying the agglomerates.

The rubber latices useful in the practice of this invention are natural rubber latex, polychloroprene latex, polybutadiene latex, the latices of the rubbery copolymers of butadiene and styrene and the latices of the rubbery copolymers of butadiene and acrylonitrile. Of these, the latices of the rubbery copolymers of butadiene and styrene and the latices of the rubbery copolymers of butadiene and acrylonitrile are preferred.

The acid-stable synthetic emulsifiers useful in the practice of this invention may be anionic, cationic or non-ionic in nature. The anionic acid-stable synthetic emulsifiers include (1) the metal salts of alkyl aryl sulfonates, examples of which are the sodium alkyl aryl sulfonates, such as sodium dodecyl naphthalene sulfonate and similar materials sold under the trade name Nacconol NR by National Aniline, (2) the metal salts of alkyl sulfonates, examples of which are sodium myristyl sulfonates and sodium n-decyl sulfonate, (3) the metal salts of alkyl sulfates such as sodium lauryl sulfate and sodium myristyl sulfate, (4) the metal salts of sulfated and sulfonated amides and amines such as sodium alkyl phenol ethylene oxide sulfate and, (5) the metal salts of sulfated and sulfonated esters and ethers, such as the ester of oleic acid and hydroxyethane sodium sulfate.

Materials that are cationic in nature when ionized may also be useful in the practice of this invention. Some of these cationic acid-stable materials are: dipolyoxyethylene alkyl tertiary amines resulting from the condensation of ethylene oxide with organic amines, where the alkyl group is derived from fatty acids containing from 12 to 18 carbon atoms and from 2 to 50 mols of ethylene oxide are used. Examples of such materials are available commercially under the trade name "Ethomeens" from Armour and Company, Chicago, Illinois. Another type of useful cationic material is the rosin acid substituted amine salts such as dihydroabietylamine acetate commercially available under the trade name "Rosin Amine D" from Hercules Powder Company, Wilmington, Delaware.

Nonionic wetting agents or emulsifiers that are acid-stable are also useful in the practice of this invention. One of these nonionic materials is an alkylated aryl polyether alcohol such as the material sold under the trade name "Triton X–100" by Rohm and Haas, Philadelphia, Pennsylvania.

In the practice of this invention it is preferred to use an alkyl aryl sulfonate such as sodium alkyl aryl sulfonate. With some powdered accelerators it is helpful to use, in conjunction with the acid-stable anionic sodium alkyl aryl sulfonate, a small amount of an acid-stable nonionic material such as an alkylated aryl polyether alcohol or a cationic material such as a dipolyoxyethylene alkyl tertiary amine.

In addition to the acid-stable emulsifier, the latex should contain an antioxidant such as phenyl beta naphthylamine and preferably a non-discoloring antioxidant, such as the styrenated and alkylated phenols and phenyl phosphites, in order to preserve the rubber content of the agglomerate against aging during storage.

The presence in the agglomerate of only a minimum amount of rubber hydrocarbon from the latex is preferred for the reason that the users of the accelerator desire one which contains the least possible amount of non-accelerator material. It has been found that the latex required to produce satisfactory agglomerates of the specific accelerators mentioned above should provide at least 4 parts by weight of rubber hydrocarbon per 100 parts by weight of the powdered accelerator. While satisfactory agglomerates can be produced using as much as 10 parts by weight of rubber hydrocarbon per 100 parts by weight of accelerator, it is preferred that from 4 to 6 parts by weight be used to minimize the dilution of the accelerator by the rubber hydrocarbon.

The chemical preparation of the accelerators themselves usually results in an aqueous slurry of the powdered material which can be employed in the preparation of the agglomerated accelerators without the requirement of first drying the accelerators and subsequently re-wetting them to form the slurry required for the agglomerating process. It is, therefore, economical and efficient to employ the aqueous slurry of the accelerators before the accelerator itself is dried to a powder, rather than to dry the accelerator and subsequently form the aqueous slurry. If, however, dried accelerators are employed in the preparation of the agglomerated material, it has been found to be advisable to employ in the aqueous slurry a wetting agent, such as the emulsifiers described above. It is also sometimes advisable to use a water-soluble salt such as sodium chloride or potassium chloride in the slurry of accelerator to aid in preventing premature coagulation of the latex to be added later.

The latex containing the antioxidant and the acid-stable synthetic emulsifier is mixed with the aqueous slurry of the accelerator. Although it is possible to use a concentrated latex in the mixing operation, it has been found to be advisable, in order to insure complete mixing before coagulation, to add the latex in the form of a relatively dilute solution such as one containing approximately from 5 to 10% rubber hydrocarbon by weight. After the latex and aqueous slurry of accelerator have been thoroughly blended, the latex is coagulated by the addition of a relatively small amount of a salt which will either create an acid condition in the solution or will form an insoluble salt with the synthetic emulsifiers. Materials which have been found to be effective for the coagulation of the latex include alum and magnesium sulfate. Heat is also helpful in the coagulation of the latex.

After the latex has been coagulated, the excess water is removed by decantation or filtration, using additional water if necessary to remove the water-soluble salts from the aqueous slurry. Sufficient water is removed from the slurry to provide a mixture having a paste-like consistency which lends itself readily to the formation of agglomerates by means of any conventional type of pellet-forming apparatus, such as a granulator, molding press, corrugated rolls or an extruder. The amount of water remaining in the paste-like mixture will depend upon the particular accelerator being agglomerated and is believed to be at least in part controlled by the particle size and shape of the particular accelerator. In general, it has been found that the larger the particle size, the smaller the amount of water required to provide the paste-like consistency necessary for the formation of the agglomerates. It has been observed that from 10% to 50% water by weight of the total mix is required to provide the desired paste-like consistency, with the exact amount being determined by the particle size of the accelerator.

The preferred method for forming agglomerates is to extrude the paste-like mixture through a die provided with a plurality of small cylindrical holes. The mixture leaves the extruder in the form of strings or rods which are collected, preferably on a moving belt and dried. Excessively high temperatures should be avoided to prevent discoloration or melting of the accelerator agglomerates. During the drying operation the remaining water present in the product is removed, leaving an agglomerate of the powdered accelerator containing the rubber and water-insoluble solids content of the latex as the only diluents of the otherwise pure accelerator. If desired for purposes of identification, it is possible to produce colored agglomerated accelerators by the addition of small amounts of coloring agents to the aqueous slurry.

Further details of the practice of this invention are set forth in the following examples in which parts are shown by weight unless otherwise stated. These examples are to be interpreted as representative rather than restrictive of the scope of this invention.

*Example 1*

Water (1000 parts) was added to 31.8 parts of a latex prepared from 67 parts of butadiene and 33 parts of acrylonitrile using 5 parts of a sodium alkyl aryl sulfonate as the emulsifier. The latex contained 10 parts of rubber hydrocarbon and 0.125 part of styrenated phenol as a non-discoloring antioxidant. The latex was added to an aqueous slurry of 2000 parts of water, 100 parts of sodium chloride, 1 part of an alkylated aryl polyether alcohol and 190 parts of powdered mecaptobenzothiazole. This combined mixture was thoroughly agitated and 100 parts of 10% aqueous solution of alum was added to coagulate the rubber latex. The excess water was decanted from the mixture and the residue washed 10 times with water, the excess water being decanted after each washing. After the last washing, the mixture was filtered leaving a residue having a paste-like consistency. The paste-like mixture was extruded into string-like or rod-like shapes and dried at 125° F.

*Example 2*

Water (500 parts) was added to 45.2 parts of a latex prepared from 75 parts of butadiene and 25 parts of styrene, using 5 parts of a sodium alkyl aryl sulfonate as the emulsifier. This latex contained 15.8 parts of rubber hydrocarbon and 0.2 part of styrenated phenol as a non-discoloring antioxidant. This diluted latex was added to an aqueous slurry of 2000 parts of water, 100 parts of sodium chloride, 1.5 parts of dipolyoxyethylene alkyl tertiary amine, 100 parts of mercaptobenzothiazole and 200 parts of tetramethyl thiuram disulfide. This combined mixture was thoroughly blended and the rubber latex coagulated with 100 parts of a 10% aqueous solution of alum. The excess water was decanted and the residue washed 10 times with water, the excess water being decanted after each washing. After the last washing, the mixture was filtered leaving a residue of paste-like consistency which was extruded into string-like or rod-like shapes and dried at 125° F.

*Example 3*

The same procedure was followed as in Example 1 except that the latex was made by the reaction of 55 part of butadiene and 45 parts of acrylonitrile using a sodium alkyl aryl sulfonate as the emulsifier.

*Example 4*

Water (350 parts) was added to 32.5 parts of a latex prepared from 75 parts of butadiene and 25 parts of styrene using 5 parts of a sodium alkyl aryl sulfonate as the emulsifier. The latex contained 11.35 parts of rubber hydrocarbon and 0.125 part of styrenated phenol. This diluted latex was added to an aqueous slurry of 1,940 parts of water, 2,720 parts of the sodium salt of mercaptobenzothiazole, and 90.8 parts of zinc sulfate. This combined mixture was thoroughly agitated and 150 parts of a 10% solution of sulfuric acid was added to coagulate the rubber latex. The excess water was decanted from the mixture and the residue repeatedly washed with water, the excess water being decanted after each washing. After the last washing the mixture was filtered, leaving a residue of paste-like consistency which was extruded into string-like or rod-like shapes and dried at 120° F.

*Example 5*

Water (375 parts) was added to 28.7 parts of a latex prepared from 75 parts of butadiene and 25 parts of styrene using 4 parts of a sodium alkyl aryl sulfonate as the emulsifier. The latex contained 10.2 parts of rubber hydrocarbon and 0.125 part of styrenated phenol. This diluted latex was added to an aqueous slurry of 2,000 parts of water, 50 parts of sodium chloride and 190 parts of tetramethyl thiuram monosulfide. This combined mixture was thoroughly agitated and 10 parts of magnesium sulfate was added to coagulate the rubber latex. The excess water was decanted from the mixture and the residue was washed repeatedly with water. After the last washing the mixture was filtered, leaving a residue having a paste-like consistency which was extruded into rod-like shapes and dried at 125° F.

*Example 6*

Water (72.3 parts) was added to 28.7 parts of a latex prepared from 75 parts of butadiene and 25 parts of styrene using 4 parts of a sodium alkyl aryl sulfonate as the emulsifier. The latex contained 10.2 parts of rubber hydrocarbon and 0.125 part of styrenated phenol. This diluted latex was added to an aqueous slurry of 2,000 parts of water, 50 parts of sodium chloride, and 190 parts of tetramethyl thiuram disulfide. This combined mixture was thoroughly agitated and 10 parts of alum was added to coagulate the rubber latex. The excess water was decanted from the mixture and the residue was repeatedly washed with water. After the last washing the mixture was filtered, leaving a residue having a paste-like consistency which was extruded into rod-like shapes and dried at 125° F.

The sodium alkyl aryl sulfonate employed in the examples is sold by National Aniline under the trade name Nacconol NR.

The agglomerated accelerators prepared according to Examples 1 through 6 formed stable, non-dusting, rod-like agglomerates which were free-flowing. When these agglomerates were mixed with rubber on a mill or in a Banbury, in accordance with normal practice, the agglomerates dispersed more rapidly and more uniformly than did the dry powdered accelerators from which the agglomerates were made. Thus, it will be seen that by following the practices of this invention, it is possible to produce a free-flowing, stable, non-dusting agglomerated accelerator containing only a minimum amount of diluent. The agglomerates themselves maintain their stability during storage and handling operations and yet disperse rapidly and uniformly into and through the rubber compound with which they are used.

While certain representative embodiments and details have been shown for the purpose of illustrating the invention, it will be apparent to those skilled in this art that various changes and modifications may be made therein without departing from the spirit or scope of the invention.

We claim:

1. A method for preparing an agglomerated compounding ingredient for rubber which comprises mixing an aqueous slurry of at least one powdered vulcanization accelerator selected from the group consisting of tetramethyl thiuram disulfide, tetraethyl thiuram disulfide, tetramethyl thiuram monosulfide, zinc dimethyl dithiocarbamate, zinc diethyl dithiocarbamate, zinc dibutyl dithiocarbamate, mercaptobenzothiazole, water insoluble metallic salts of mercaptobenzothiazole, and benzothiazyl disulfide with a latex stabilized against coagulation by at least one acid-stable emulsifier and a rubber antioxidant, said latex being selected from the group consisting of natural rubber latex, polychloroprene latex, polybutadiene latex, the latices of the rubbery copolymers of butadiene and styrene and the latices of the rubbery copolymers of butadiene and acrylonitrile, the mixture containing from 4 to 10% rubber hydrocarbon by weight of said accelerator, coagulating the rubber latex, removing the excess water, forming agglomerates of the mixture, drying the agglomerates to remove remaining water and collecting the dried agglomerates.

2. A method for preparing an agglomerated compounding ingredient for rubber which comprises forming a mixture of an aqueous slurry of at least one powdered vulcanization accelerator selected from the group consisting of tetramethyl thiuram disulfide, tetraethyl thiuram disulfide, tetramethyl thiuram monosulfide, zinc dimethyl dithiocarbamate, zinc diethyl dithiocarbamate, zinc dibutyl dithiocarbamate, mercaptobenzothiazole, water insoluble metallic salts of mercaptobenzothiazole, and benzothiazyl disulfide with a latex stabilized against coagulation by at least one acid-stable synthetic emulsifier and a non-discoloring rubber antioxidant, said latex being selected from the group consisting of natural rubber latex, polychloroprene latex, polybutadiene latex, the latices of the rubbery copolymers of butadiene and styrene and the latices of the rubbery copolymers of butadiene and acrylonitrile, the mixture containing from 4 to 6% rubber hydrocarbon by weight of said accelerator, coagulating the rubber latex, removing the excess water, forming agglomerates of the mixture, drying the agglomerates to remove remaining water and collecting the dried agglomerates.

3. A method for preparing an agglomerated compounding ingredient for rubber which comprises adding a latex containing at least one acid-stable synthetic emulsifier and a non-discoloring rubber antioxidant, said latex being selected from a group consisting of natural rubber latex, polychloroprene latex, polybutadiene latex, the latices of the rubbery copolymers of butadiene and styrene and the latices of the rubbery copolymers of butadiene and acrylonitrile, to an aqueous slurry of at least one powdered vulcanization accelerator selected from the group consisting of tetramethyl thiuram disulfide, tetraethyl, thiuram disulfide, tetramethyl thiuram monosulfide, zinc dimethyl dithiocarbamate, zinc diethyl dithiocarbamate, zinc dibutyl dithiocarbamate, mercaptobenzothiazole, water insoluble metal salts of mercaptobenzothiazole, benzothiazyl disulfide, the latex being in an amount that the mixture shall contain from 4 to 10% rubber hydrocarbon by weight of said accelerator, coagulating the rubber latex, dewatering the mixture, extruding the mixture to form strings or rods, drying the strings or rods to remove remaining water and collecting the dried material.

4. A method for preparing an agglomerated compounding ingredient for rubber which comprises forming an aqueous slurry of at least one powdered vulcanization accelerator selected from the group consisting of tetramethyl thiuram disulfide, tetraethyl thiuram disulfide, tetramethyl thiuram monosulfide, zinc dimethyl dithiocarbamate, zinc diethyl dithiocarbamate, zinc dibutyl dithiocarbamate, mercaptobenzothiazole, water insoluble metal salts of mercaptobenzothiazole, benzothiazyl disulfide, with a latex containing a water-soluble, acid-stable synthetic emulsifier and a non-discoloring rubber antioxidant, said latex being selected from a group consisting of natural rubber latex, polychloroprene latex, polybutadiene latex, the latices of the rubbery copolymers of butadiene and styrene and the latices of the rubbery copolymers of butadiene and acrylonitrile, the mixture containing from 4 to 6% rubber hydrocarbon by weight of said accelerator, coagulating the rubber latex, removing the excess water, extruding the mixture to form strings or rods, drying the strings or rods to remove the remaining water and collecting the dried material.

5. The method for preparing an agglomerated compounding ingredient for rubber which comprises adding (A) a latex containing at least one water-soluble, acid-stable synthetic emulsifier and a non-discoloring rubber antioxidant, said latex being selected from a group consisting of natural rubber latex, polychloroprene latex, polybutadiene latex, the latices of the rubbery copolymers of butadiene and styrene and the latices of the rubbery copolymers of butadiene and acrylonitrile to (B) an aqueous slurry of at least one powdered vulcanization accelerator selected from a group consisting of tetramethyl thiurum disulfide, tetraethyl thiurum disulfide, tetramethyl thiuram monosulfide, zinc dimethyl dithiocarbamate, zinc diethyl dithiocarbamate, zinc dibutyl dithiocarbamate, mercaptobenzothiazole, water insoluble metal salts of mercaptobenzothiazole, benzothiazyl disulfide, the mixture containing from 4 to 10% rubber hydrocarbon by weight of said accelerator, allowing the rubber latex to coagulate, dewatering, forming agglomerates of the mixture, drying the agglomerates to remove water and collecting the dried agglomerates.

6. A method according to claim 1 in which the powdered vulcanization accelerator is benzothiazyl disulfide.

7. A method according to claim 2 in which the powdered vulcanization accelerator is mercaptobenzothiazole.

8. A method according to claim 2 in which the powdered vulcanization accelerator is the zinc salt of mercaptobenzothiazole.

9. The method according to claim 2 in which a latex of the rubbery copolymer of butadiene and styrene is employed.

10. The method according to claim 9 in which the powdered vulcanization accelerator is the zinc salt of mercaptobenzothiazole.

11. The method according to claim 3 in which the latex stabilizer is a sodium salt of an alkyl aryl sulfonate.

12. A method according to claim 2 in which the powdered vulcanization accelerator is tetramethyl thiuram disulfide.

13. A compounding ingredient for rubber in the form of dry agglomerates prepared according to the method described in claim 1.

References Cited in the file of this patent

UNITED STATES PATENTS

| | | |
|---|---|---|
| 2,565,998 | Swaney et al. | Aug. 28, 1951 |
| 2,640,088 | Glenn et al. | May 26, 1953 |